United States Patent [19]

Robinson et al.

[11] 4,416,858

[45] Nov. 22, 1983

[54] CONTACTOR

[75] Inventors: Lee F. Robinson, London, England; Giuliano Porcari, Edmonton, Canada

[73] Assignee: RTL Contactor Holding S.A., Switzerland

[21] Appl. No.: 406,448

[22] Filed: Aug. 9, 1982

Related U.S. Application Data

[63] Continuation of Ser. No. 161,299, Jun. 20, 1980, abandoned.

[30] Foreign Application Priority Data

Jun. 22, 1979 [GB] United Kingdom ............... 7921906

[51] Int. Cl.³ ................ B01D 11/02; B01D 11/04
[52] U.S. Cl. ................ 422/259; 196/14.52; 366/228; 422/269; 422/272
[58] Field of Search ............... 422/258, 259, 268–272, 422/275, 273; 366/221, 225, 226, 228, 235; 196/14.52

[56] References Cited

U.S. PATENT DOCUMENTS

| 2,941,871 | 6/1960 | Geller et al. | 422/259 |
| 3,024,538 | 3/1962 | Madsen | 366/228 |
| 3,025,611 | 3/1962 | Preeman | 366/228 |
| 3,649,209 | 3/1972 | Coleby | 422/269 |
| 3,910,756 | 10/1975 | Henning | 366/228 |
| 4,244,923 | 1/1981 | Hohlbaum | 422/273 |

FOREIGN PATENT DOCUMENTS 972035 10/1964 United Kingdom .

Primary Examiner—Bradley Garris
Attorney, Agent, or Firm—Lee, Smith & Jager

[57] ABSTRACT

A continuous contactor comprises a rotary tubular rotor through which the streams to be contacted flow. The rotor has an inner wall which is substantially cylindrical and an outer wall spaced from the inner wall. The rotor is divided internally into a number of rings of buckets by axial and radial separators. Each bucket has an opening in the cylindrical inner wall at the leading part of the bucket with respect to the direction of rotation of the rotor.

17 Claims, 9 Drawing Figures

CONTACTOR

This is a continuation of application Ser. No. 161,299, filed June 20, 1980 and now abandoned.

BACKGROUND OF THE INVENTION

This invention relates to a contactor for mass transfer between two phases, and is particularly concerned with a continuous liquid/liquid or solids/liquid contactor comprising a vesel through which the phases pass and in which buckets within the vessel promote intermingling of the phases.

A contactor of the type referred to has been described for liquid/liquid contacting in British Pat. No. 972,035 and, for solids/liquid contacting, in U.S. Pat. No. 3,649,209. In each, the buckets are of approximately semi-cylindrical form and are carried between radial partition discs, dividing the interior into a series of compartments. The buckets are located adjacent the peripheries of the discs, and, in each compartment, there are a number of buckets which are spaced apart around the axis of rotation of the rotor constituted by the discs and buckets.

In operation of the known contactor, the two phases are passed through the vessel, preferably in countercurrent, while the rotor is turned gently. A nominally stable interface is formed between the two phases at approximately the horizontal plane passing through the axis of rotation. In practice, however, it has been found that the passage of the distinct buckets through the interface and their wakes break up the interface and entrain in each liquid phase minute particles or bubbles of the other phase. Because of their size, the minute bubbles do not migrate readily, if at all, back to the parent phase and are carried out of the contactor vessel with the other phase. The distinct buckets and the rods which bridge successive discs and which are shown in the U.S. patent specification further create vortices in the two phases, again resulting in the generation of particles which settle only with difficulty.

SUMMARY OF THE INVENTION

In order to avoid those disadvantages, in the present invention, the buckets are formed by a bucket assembly comprising two tubular members one within the other, each centred on a common axis of rotation, and defining between them a ring-like space divided by partitions arranged parallel to, and transverse to, the axis of rotation, each bucket so formed having an opening through the inner tubular member. The buckets are then contiguous and present a smooth profile to the liquids through which they travel, with the result that there is a reduction in the turbulence and the vortices created by the movement of the buckets.

Usually, the tubular members are coaxial right-circular cylinders, in which case the ring-like space is an annulus bounded by the cylinders. Each bucket opening is preferably a slot extending parallel to the axis of rotation and located at the forward end of the bucket in the direction of rotation.

Although the vessel may be a rotary drum, in which case the outer tubular member is constituted by the drum itself, it is preferred to have the vessel stationary, with the two hollow cylinders mounted for rotation together within the vessel. In that case, there may be rotary seals between the vessel and the bucket assembly causing the phases to pass through the assembly. Advantageously, there are baffles within the bucket assembly requiring the phase to take an undulating path through that assembly.

BRIEF DESCRIPTION OF THE DRAWINGS

The invention will be more readily understood by way of example from the following description of a rotary contactor in accordance therewith, reference being made to the accompanying drawings in which.

DESCRIPTION OF THE PREFERRED EMBODIMENTS

Referring to FIGS. 1 to 6, the contactor consists of a stationary, cylindrical drum 12 and a rotor 13 mounted therein. As shown, the rotor comprises a shaft 14 arranged axially of the drum 12 and passing through openings in the end plates 15, provided with rotary seals. The shaft 14 is carried in bearings external of the drum 12 and is driven by an external motor (not shown).

Figure 4:
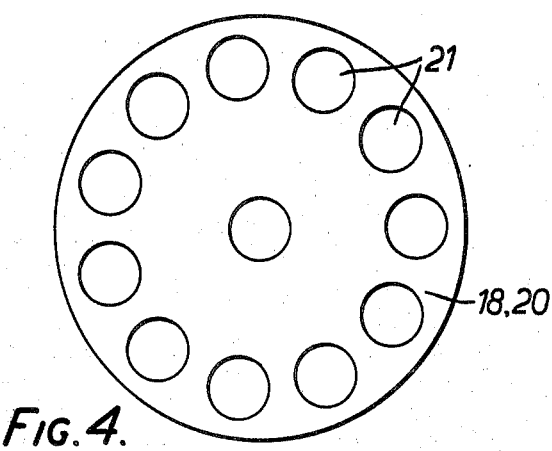
FIG. 4 shows one of the support discs of the rotor.

The rotor further comprises two coaxial right-circular cylinders 16, 17, which are secured together and to the shaft 14 by end support discs 18 and a central support disc 20, each of which is perforated by a ring of holes 21 (FIG. 4). The annular space between the cylinders 16, 17 is divided into rings of buckets by radial partitions 22 and by lengthwise partitions 23 which extend parallel to the rotor axis. Each bucket 24, so formed, communicates with the interior of the inner cylinder 17 by means of a slot-like opening 25 extending over the entire longitudinal width of the bucket, and disposed at the forward end of the bucket in the direction of rotation.

Figure 5:
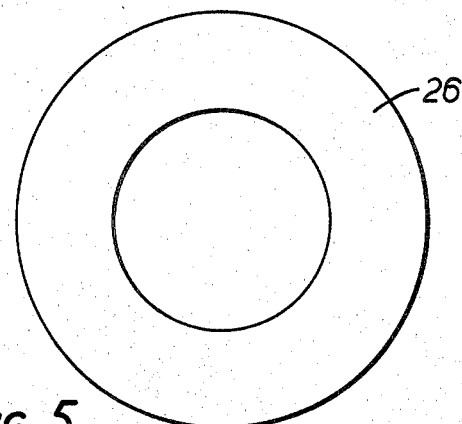
FIGS. 5 and 6 show the two types of baffles employed in the rotor.
Figure 6:
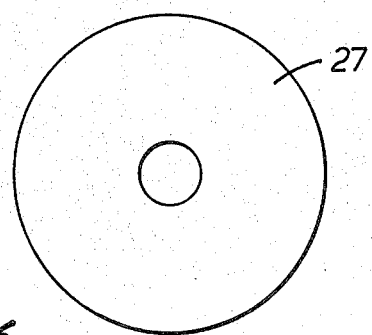

The rotor 13 further carries radially arranged baffles spaced apart along the axis of the rotor. The baffles are of two different types, which alternate: baffles 26, shown in FIG. 5 are of annular form and extend from the outer cylinder 16 to points spaced from the shaft 14, and thus constitute some of the radial partitions 22; baffles 27 (FIG. 6) are secured about the shaft 14 and extend radially, with their peripheries spaced from the inner cylinder 17. Circular rotary seals 28 are carried by the drum 12 and bear against the faces of the ends discs 18, in order to prevent the ingress of liquid into the annular passage between the rotary cylinder 16 and the drum 12. Ingress is further prevented by keeping that annular space at a pressure above that subsisting elsewhere in the drum 12, as by supplying a fluid under pressure to that space.

Figure 2:
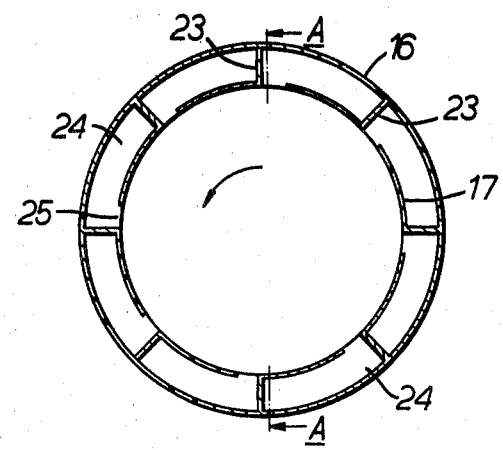
FIGS. 2 and 3 are respectively a radial section of the rotor of FIG. 1, and an axial section on the line A—A of FIG. 2, the rotor shaft being omitted for convenience.
Figure 3:
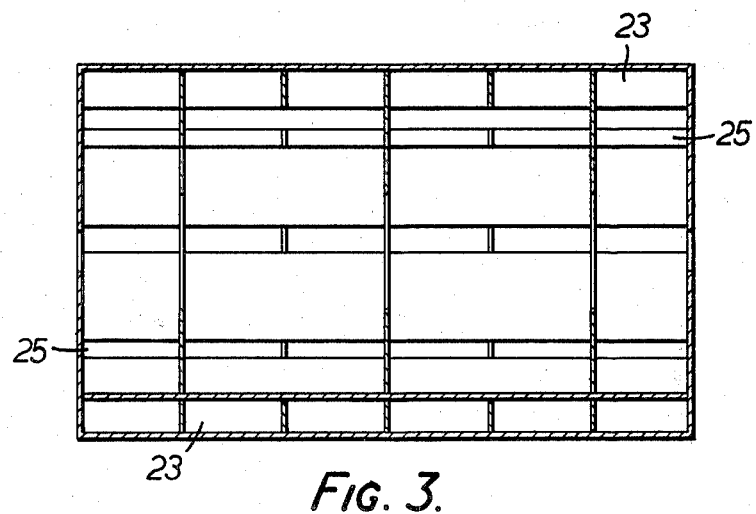

By virtue of the radial partitions 22 and the axial partitions 23, the buckets 24 are formed as successive rings, in each of which each bucket immediately succeeds the preceding bucket (see FIG. 2). The profiles of the rings of buckets, and particularly that of the internal surface thereof, are smoothly cylindrical and present no part capable of giving rise to turbulence, as the rotor turns in the liquid phases.

The operation of the contactor is generally similar to that described in the above patent specifications. Thus, the feed, which is a first liquid enters the contactor through pipe 30 at one end and discharges through pipe 31 at the other end. The second liquid, with which the feed is to be contacted, is introduced through an inlet pipe 32 at the second end of the contactor and leaves through exit pipe 33 adjacent the first end, with the result that the two phases travel through the contactor in counter-current. Each phase enters the rotor 13 through the holes 21 in the end discs 18 and, as the two liquids are immiscible and of different densities, form a stable interface approximately at the shaft 14. During their travel through the rotor, the liquids are caused to follow an undulating path, by virtue of the baffles 26, 27. The second phase entering through pipe 32 in particular is prevented from bypassing the rotor and therefore failing to contact the first phase, by virtue of the seals 28.

As the feed passes through the contactor, it is repeatedly lifted up by the buckets 12, carried up into the heavier phase and discharged into that phase, near the top of the bucket travel, in the form of bubbles, which migrate back to the lower phase, contacting the lighter phase in its transit. At the same time, the buckets carry down the lighter phase and discharge it, again as bubbles in the heavier phase. As a consequence, there is intimate intermingling of the two phases, causing mass transfer between the phases to occur.

The spaces at the ends of the drum 12, i.e. between the end plates 15 of the drum and the end support discs 18 form settlement chambers, in which there is no intermixing of the phases and in which the phases separate substantially completely to minimise the amount of the lighter phase being carried out with the heavier phase through pipe 31 and the amount of the heavier phase being carried out with the lighter phase through discharge pipe 33. Where the feed entering through pipe 30 contains fines, settlement of those fines occurs in the left hand settlement chamber and a bleed outlet is provided in the bottom of the chamber for periodic removal of the fines.

By virtue of the internal surfaces of the buckets (the cylinder 17), those buckets travel through the interface without a wake, without turbulence and without the creation of vortices. The result is that there is little break up of the liquids into particles of small diameter, likely to cause the liquid of the first phase to be carried out of the contactor with the second phase, and vice versa.

Figure 7:
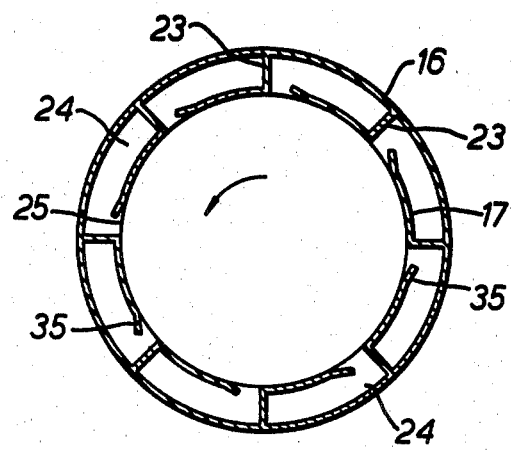
FIG. 7 is a section similar to FIG. 2, but illustrating a modification.

The bucket assembly has further advantages. The bucket volume for unit axial length is considerably higher compared with the corresponding volume for distinct buckets as illustrated in the above patent specifications, permitting a lower rotational speed for the same degree of contacting. Each phase is discharged from each bucket into the other phase over a relatively large arc of rotation centred on the vertical plane through the shaft 14. The discharged phase is thus distributed more evenly through the other phase; uniformity of discharge can be assisted by serrating the discharge edge of each slot 25 and/or by turning outwardly, i.e. into the buckets 24, the leading edge of the internal walls of the buckets formed by the cylinder 17, as shown at 35 in FIG. 7. The out-turned edges 35 may additionally be perforated and, when highly viscous liquids are involved, the internal walls of the buckets can additionally be perforated behind the out-turned edges. Lastly, there is a reduction in the creation of vortices due to the inflow of each phase into the buckets, because of the restricted width of the slots 25 and hence the reduced inflow velocity.

In order to achieve optimum operation of the contactor with particular liquids, the dimensions of the bucket slots 25 and of the holes 21 in the discs 18 and 20 should be selected according to parameters of the liquids and of the contactor; in particular, those dimensions are dependent on the relative densities of the liquids and the speed at which the rotor turns in an empirically determinable manner. So that the contactor may be used with liquids of different densities without the need to replace, or reconstruct, the rotor 13, the circumferential width of each slot 25 and the diameter of each hole 21 are made larger than the maximum required and each slot and hole is provided with an adjustable, sliding, cover by which the slot or hole can be closed to a desired extent and locked in any desired position. When the contactor is to be operated with liquids that have not been used before, the new settings for the covers are varied by trial and error until optimum operation is achieved and the covers then locked in those settings, the settings being recorded for future use. By the use of the adjustable covers, the contactor is rendered versatile, being usable without major modification with a variety of input liquids.

Figure 8:
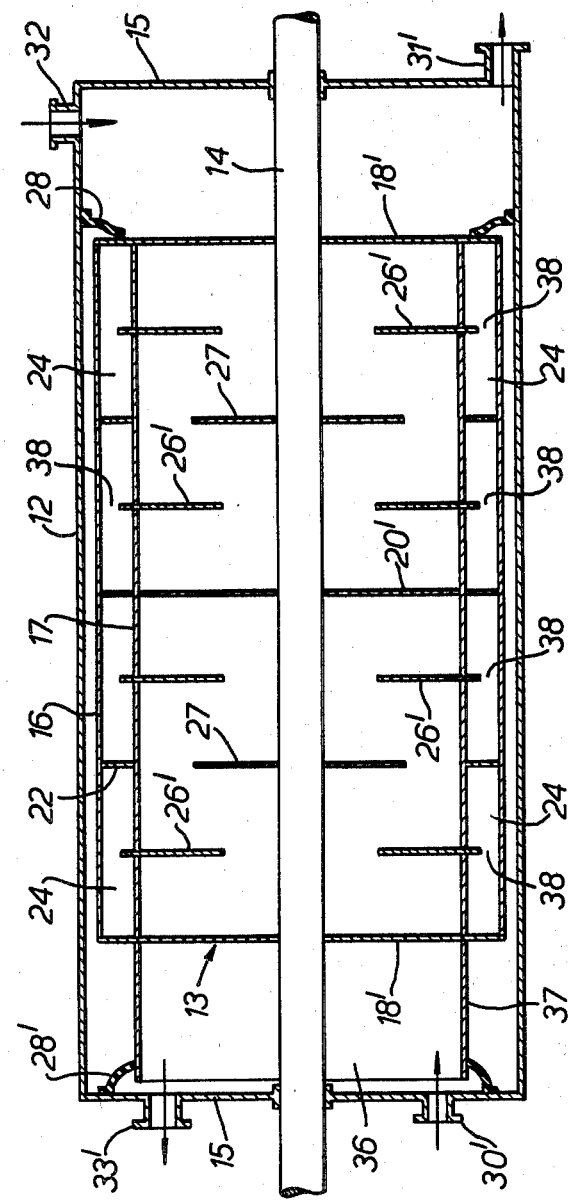
FIG. 8 is a section similar to FIG. 1, but modified as a liquid/solids contactor.

For use as a liquid/solids contactor, i.e. when a slurry is to be contacted with a treatment liquid, the modified construction shown in section in FIG. 8 is adopted. Apart from the features to be mentioned, the construction of FIG. 8 is similar to that of FIGS. 1 to 6 and like parts in the two constructions are given the same reference numerals.

Because the feed now contains solids which must be capable of moving unobstructed along the bottom of the contactor, the perforated end support discs 18 and the perforated central support discs 20 are replaced by assemblies of narrow spokes 18' and 20' respectively. The inner cylinder 17 has an extension 37 into the left hand settlement chamber 36 to terminate adjacent to the drum wall 15 and the left hand rotary seal 28 of FIG. 1 replaced by a rotary seal 28' between wall 15 and the extension 37. The feed inlet pipe 30' and the treatment liquid outlet pipe 33' are located in the drum end plate 15 within the seal 18' so that the slurry feed enters directly into the inner cylinder 17 and the treatment liquid discharges directly from that cylinder. The raffinate outlet pipe is repositioned at 31' to be closely adjacent the bottom of the drum 12 to ease the discharge of solids.

Figure 1:
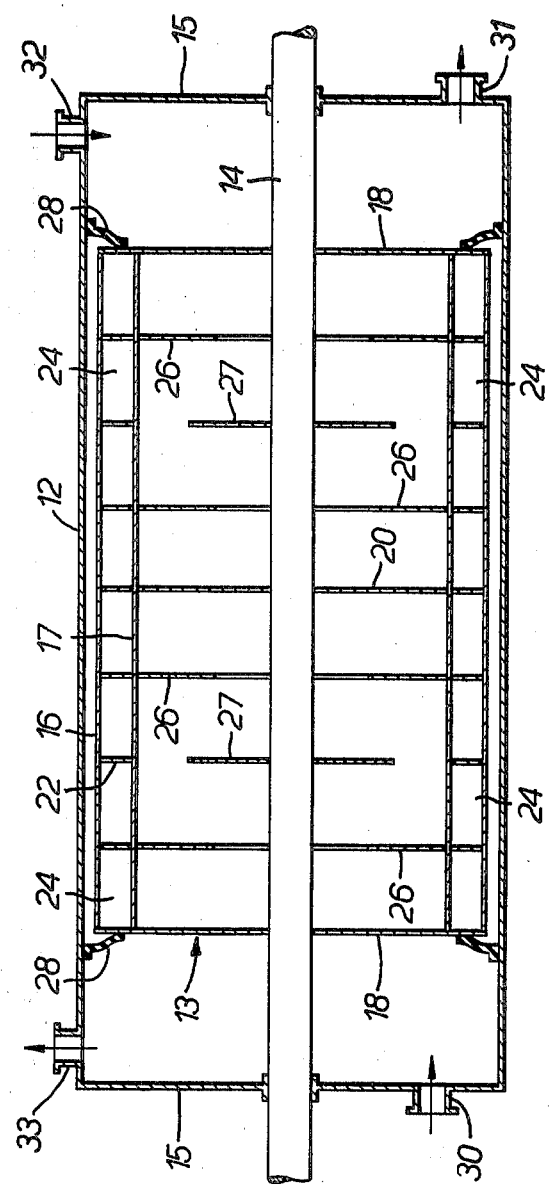
FIG. 1 is a vertical axial section through a liquid/liquid contactor.

The annular baffles 26 of FIG. 1 are modified as shown at 26' in FIG. 8, again to allow movement of solids along the contactor. Where those baffles 26' extend between the cylinders 16 and 17 to form radial bucket partitions, they have slots 38 at intervals around the peripheries of the baffles. Each baffle 26' can thus have one slot 38 for each of the buckets 24, but it is preferred to have only alternate buckets thus provided with a slot. In the latter case, the radial partitions 22 aligned with the discs 27 are similarly slotted, but with the slots offset circumferentially by one bucket with respect to the slots 38.

The solids are thus received in the first ring of buckets 24 at the left hand end of the rotor and, in the case of those buckets having slots 38, the solids are allowed to move into the adjacent buckets of the next ring. Similarly, solids in the alternate buckets in the second ring can pass through the slots in the partition 22 to the third ring of buckets. In this way, the solids are enabled to move along the rotor, partly by moving through the inter-bucket slots, and partly by being lifted up and released by the buckets and resettling in adjacent buckets.

If necessary, the axial movement of the solids can be further facilitated by having holes in each of the annular baffles 26' within the cylinder 17.

Figure 9:
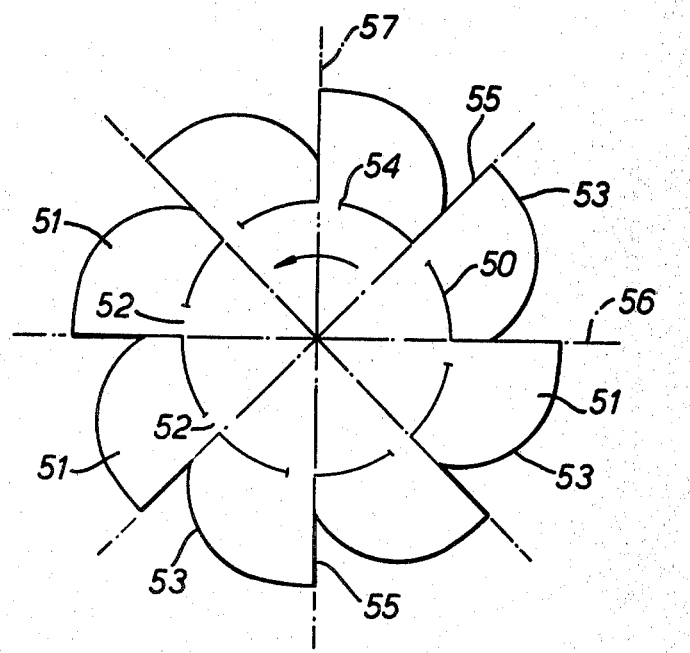
FIG. 9 is a radial section, similar to FIG. 2, but illustrating an alternative form of rotor.

The alternative form of rotor shown in radial section in FIG. 9 is intended to replace the rotor 13 of FIG. 1 and is generally similar in construction, having an inner cylinder 50 which is coaxial with the rotor axis and which forms the inner walls of the buckets 51. Slot-like openings 52, similar to 25, are disposed in cylinder 50 at the leading end of each bucket with respect to the direction of rotation.

In FIG. 9 the outer walls of the buckets 51 do not lie on an outer cylinder; instead, the outer walls of each line of buckets parallel to the rotor axis is constituted by a curved plate 53 the radial section of which is a circular arc centred approximately on the rearward edge 54 of the corresponding opening 52. As in FIG. 1, the lines of buckets 51 are separated by axial plates 55 and the buckets are separated axially by radial plates similar to those shown at 22 in FIG. 1.

The advantage of the rotor of FIG. 9 over that of FIGS. 1 and 2 is that the rate of discharge of liquid through any one of the bucket openings 52 is less dependent on the disposition of the bucket about the rotor axis. In the rotor of FIGS. 1 and 2, the rate of discharge from any particular bucket is approximately proportional to the length of the horizontal line from the rearward edge of the opening 25 (FIG. 2) to the outer cylinder 16 and, as will be apparent, that length increases progressively as that edge rises from the horizontal plane through the rotor axis to the vertical plane through that axis. It is clearly desirable that for contactor efficiency the rate of discharge should be as uniform as over that arc of movement.

In FIG. 9, on the other hand, the length of the horizontal line from the rearward edge of opening 52 to the outer wall 53 is approximately constant regardless of the position of the edge as it rises from plane 56 to plane 57, with consequential uniform rate of discharge.

We claim:

1. A contactor for continuously contacting a first flowable stream with a second flowable stream, said contactor including:
   (a) a tubular rotor having a generally cylindrical internal surface;
   (b) means for mounting said rotor for rotation about its axis; and
   (c) means for directing said streams as separate phases into and through the interior of said rotor,
   (d) said rotor including bucket-forming means comprising partitions arranged parallel to and transverse to said axis dividing said rotor into a plurality of rings of buckets bounded internally by said internal surface, whereby the buckets are contiguous and present a smooth profile to the phases through which they travel,
   (e) each said bucket having an opening in said generally cylindrical internal surface at the leading part of said bucket with respect to the direction of rotation of said rotor.

2. A contactor according to claim 1 including a stationary drum in which said rotor is mounted by said mounting means.

3. A contactor according to claim 2, wherein said drum has end plates and said rotor has ends which are spaced from the end plates to form settlement chambers.

4. A contactor according to claim 3, wherein said drum has a bleed outlet in at least one of said settlement chambers for the discharge of fines entrained with one of said streams and separated out in said one settlement chamber.

5. A contactor according to claim 1, wherein, in each said bucket, the internal surface of said rotor adjacent the trailing part of said opening with respect to the direction of rotation of said rotor has an edge outturned towards the exterior of said rotor.

6. A contactor according to claim 1, wherein, in each said bucket, the leading edge of said internal surface is serrated adjacent the trailing edge of said opening.

7. A contactor according to claim 1, wherein, in each said bucket, the leading edge of said internal surface is perforated adjacent the trailing edge of said opening.

8. A contactor according to claim 1, wherein each said bucket is bounded externally by a plate having a cross-section in the approximate shape of an arc of a circle centred on said opening of the bucket.

9. A continuous contactor, comprising
   a rotor through which pass the phases to be contacted and which includes:
   a bucket assembly, adapted to travel through the phases to promote intermingling thereof, the bucket assembly comprising:
   two tubular members one within the other, each centred on a common axis of rotation and defining between them a ring-like space; and
   partitions, dividing the ring-like space into buckets, said partitions being arranged parallel to and transverse to said axis of rotation;
   each said bucket having an opening through the inner tubular member, at the leading part of said bucket with respect to the direction of rotation of said rotor; whereby the buckets are contiguous and present a smooth profile to the phases through which they travel.

10. The contactor of claim 9, wherein the tubular means are coaxial right-circular cylinders and the ring-like space is an annulus bounded by the cylinders.

11. The contactor of claim 9, wherein each bucket opening is a slot extending parallel to the axis of rotation and located at the leading end of the bucket with respect to the direction of rotation.

12. The contactor of claim 9, including a stationary drum in which said rotor is rotatably mounted.

13. A contactor of claim 12, wherein rotary seals are provided between the drum and the bucket assembly, whereby the phases are caused to pass through the assembly.

14. The contactor of claim 12, comprising a shaft and perforated support discs carried by the shaft, whereby the tubular members are mounted for rotation.

15. A contactor according to claim 12, for the continuous contacting of a slurry of a first liquid and solids with a second liquid, wherein one end of said inner tubular member is closely adjacent the end of the drum at which the slurry is introduced, and a rotary seal is arranged between that drum end and the inner tubular member.

16. A contactor according to claim 15, including a rotary shaft and assemblies of spokes mounting said rotor on said shaft.

17. The contactor of claim 9, further comprising baffles within the bucket assembly to direct the flow of the phases through the assembly.

* * * * *